(No Model.)
G. W. WATSON.
Pantaloon Guard.
No. 241,101. Patented May 3, 1881.
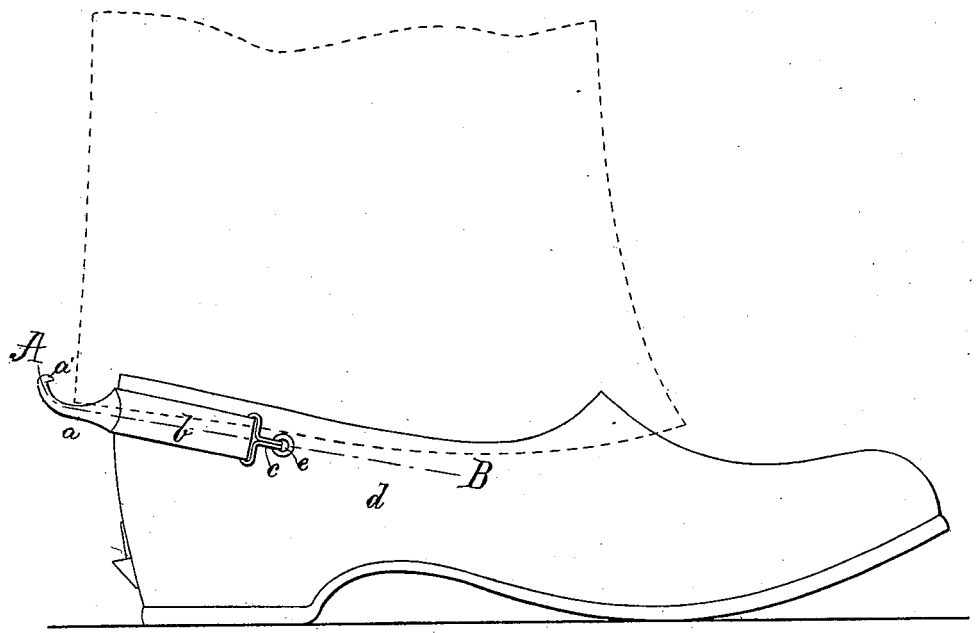
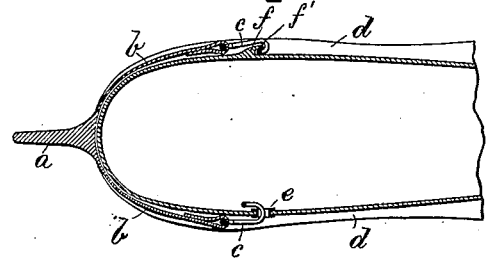
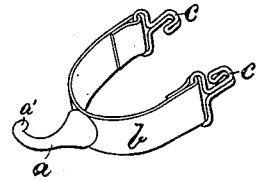
Witnesses.
Henry Chadbourn.
F. Allen.
Inventor.
George W. Watson.
by
Alban Andrew

UNITED STATES PATENT OFFICE.

GEORGE W. WATSON, OF BOSTON, MASSACHUSETTS, ASSIGNOR OF THREE-EIGHTHS TO ETHAN H. CUTLER, OF SAME PLACE.

PANTALOON-GUARD.

SPECIFICATION forming part of Letters Patent No. 241,101, dated May 3, 1881.

Application filed September 20, 1880. (No model.)

*To all whom it may concern:*

Be it known that I, GEORGE W. WATSON, a citizen of the United States, residing at Boston, in the county of Suffolk and State of Massachusetts, have invented certain new and useful Improvements in Pantaloon-Guards; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to a new and useful portable and detachable device that is particularly adapted to be secured to rubber overshoes or arctics, for the purpose of automatically holding up from the ground the lower rear edge of pantaloons when walking through mud, slush, and rain, and thus preventing the pantaloons from being soiled at such parts.

I have now pending an application in the United States Patent Office, filed June 14, 1880, for a similar device adapted to be attached to the heels of boots and shoes for the same purpose as above stated; but such device is not applicable to be attached to rubber overshoes or arctics, on account of the smallness of the heel and the curve uniting the heel and shank on said overshoes and arctics, and to make my present device adapted for the latter it is carried out as follows, reference being had to the accompanying drawings, in which—

Figure 1 represents a side elevation of a rubber overshoe with my pantaloon-guard attached. Fig. 2 represents a horizontal section on the line A B, shown in Fig. 1, and Fig. 3 represents a perspective view of the pantaloon-guard as detached from the overshoe.

Similar letters refer to similar parts wherever they occur on the different parts of the drawings.

The pantaloon-guard consists of the arm or projection $a$, that is preferably made of rubber, and provided with a hook or spur, $a'$, in combination with the elastic band $b$, that is provided in its free ends with suitable hooks, $c\ c$, as shown, and adapted to be secured in place on a rubber overshoe, $d$, as shown in Figs. 1 and 2, by inserting said hooks into perforations provided with eyelets $e$, as shown in Fig. 1, or into projection $f$ on the side of the overshoe $d$, as shown in the upper part of Fig. 2, which projection $f$ is to be made with a recess or perforation, $f'$, for the hook $c$ to be inserted into, as shown.

As eyelets may be quickly attached to the shank part of rubbers they are preferable for securing my improved pantaloon-guard to the ordinary styles of rubbers and arctics; but I may prefer, in making new rubbers or arctics to be used in combination with my improved pantaloon-guard, to provide such rubbers or arctics with the fastening device $f f'$, as shown in Fig. 2, or equivalent arrangement, without departing from the essence of my invention.

When the invention is required for use it is only necessary to secure the rubber band $b$ to the rubber or arctic by means of the hooks $c\ c$ and eyelets $e\ e$, or equivalent device, in a position as fully shown in Fig. 1, thereby allowing the rear edge of the pants to rest on the projection $a$, and thus preventing such part of the pants from getting soiled by coming in contact with the mud or slush on the ground.

Having thus fully described the nature, construction, and operation of my invention, I wish to secure by Letters Patent and claim—

The herein-described pantaloon-guard for rubber overshoes or arctics, consisting of the projection $a$, with its hook or spur $a'$, and the rubber band $b$, having hooks $c\ c$ in its free ends, and adapted to be secured to eyelets $e\ e$, or equivalent devices, on the rubber or arctic, substantially in a manner as set forth.

In testimony whereof I have affixed my signature in presence of two witnesses.

GEORGE W. WATSON.

Witnesses:
ALBAN ANDRÉN,
F. P. McKENNEY.